No. 673,907. Patented May 14, 1901.
A. P. JOHNSON.
PORTABLE CLOTHES LINE REEL.
(Application filed Aug. 20, 1900.)
(No Model.) 2 Sheets—Sheet 1.

Witnesses.
Harry Kilgore
Vera O. White

Inventor:
Andrew P. Johnson,
By his Attorneys.
Williamson Merchant

No. 673,907. Patented May 14, 1901.
A. P. JOHNSON.
PORTABLE CLOTHES LINE REEL.
(Application filed Aug. 20, 1900.)
(No Model.) 2 Sheets—Sheet 2.
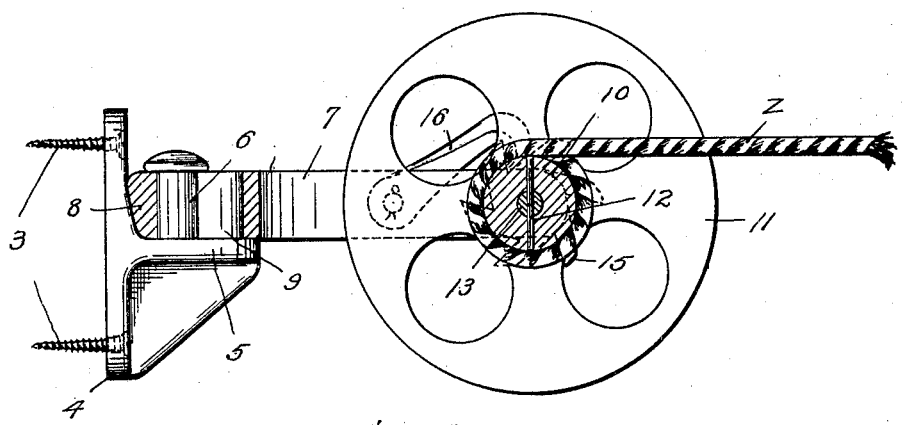
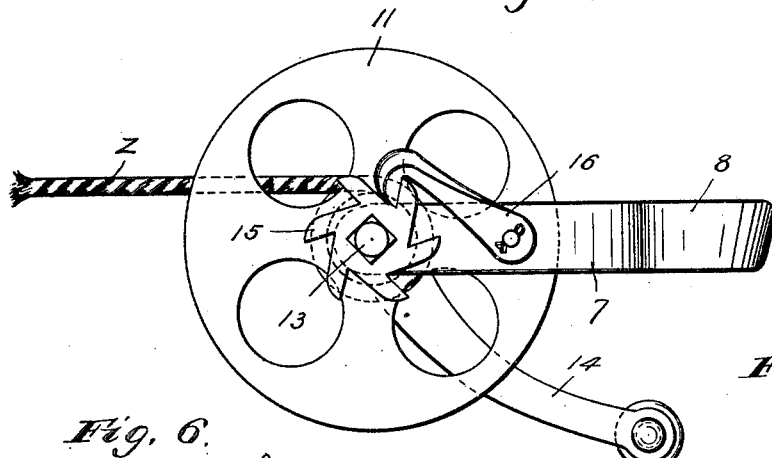
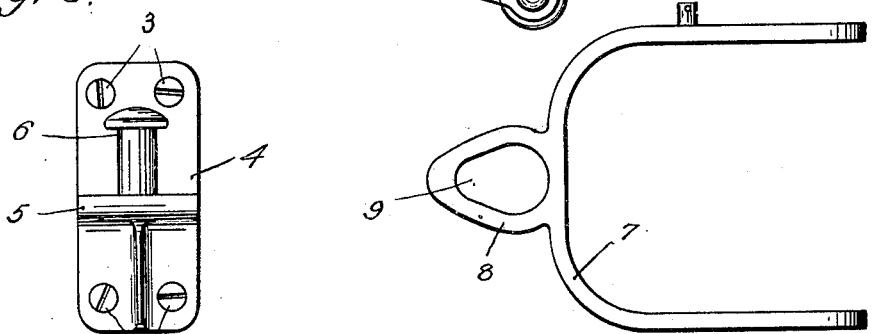
Witnesses.
Harry Kilgore
Vera O. White
Inventor.
Andrew P. Johnson.
By his Attorneys.
Williamson & Merchant

UNITED STATES PATENT OFFICE.

ANDREW P. JOHNSON, OF MINNEAPOLIS, MINNESOTA.

PORTABLE CLOTHES-LINE REEL.

SPECIFICATION forming part of Letters Patent No. 673,907, dated May 14, 1901.

Application filed August 20, 1900. Serial No. 27,369. (No model.)

*To all whom it may concern:*

Be it known that I, ANDREW P. JOHNSON, a citizen of the United States, residing at Minneapolis, in the county of Hennepin and State of Minnesota, have invented certain new and useful Improvements in Portable Clothes-Line Reels; and I do hereby declare the following to be a full, clear, and exact description of the invention, such as will enable others skilled in the art to which it appertains to make and use the same.

My invention has for its object to provide an improvement in portable clothes-line reels; and to this end it consists of the novel devices and combinations of devices hereinafter described, and defined in the claim.

The invention is illustrated in the accompanying drawings, wherein like characters indicate like parts throughout the several views.

Figure 1:
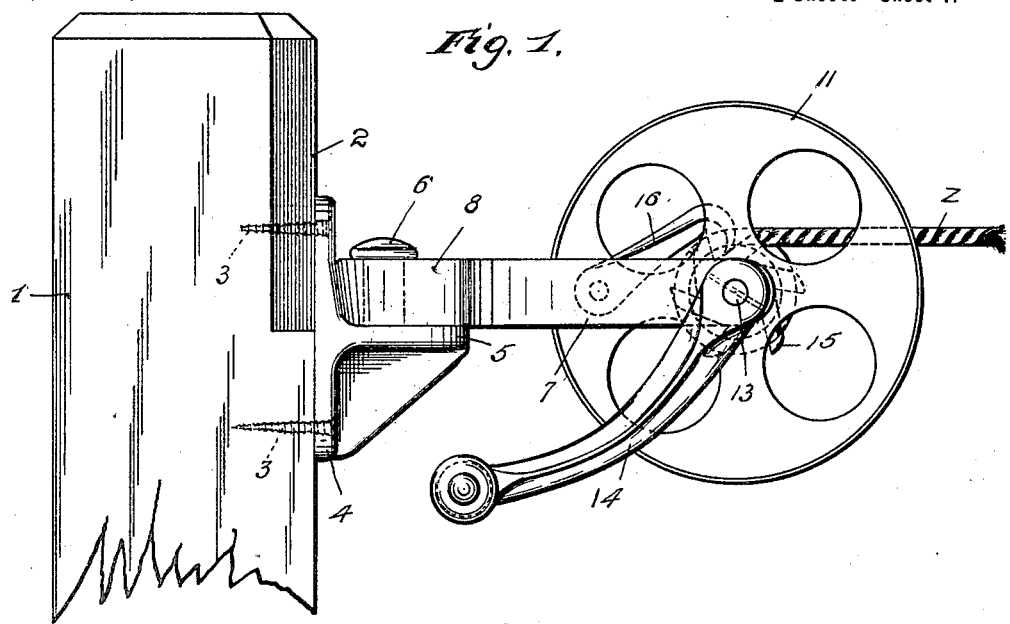
Figure 2:
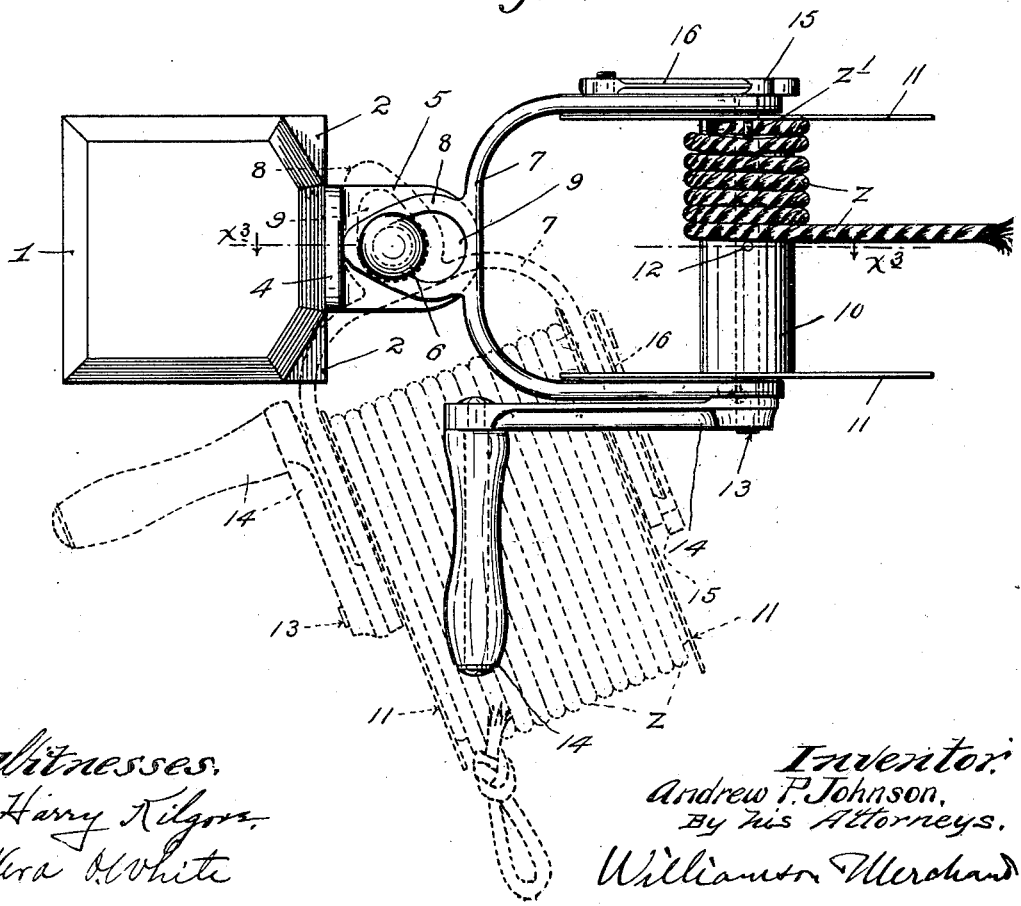

Figure 1 is a view in side elevation, showing my improved reel attached to a post. Fig. 2 is a plan view of the said reel and post, one extreme position of the reel being illustrated by dotted lines. Fig. 3 is a vertical section on the line $x^3$ $x^3$ of Fig. 2, some parts being shown in full and others removed. Fig. 4 shows the reel detached looking at the same from the opposite side from that shown in Fig. 1. Fig. 5 is a plan view in detail of the spool or drum supporting yoke; and Fig. 6 is a detail in front elevation, showing the supporting-bracket to which the yoke is detachably secured.

The numeral 1 indicates a post, which, as shown, is beveled or cut at 2 for a purpose which will presently appear. Secured to the post 1 by screws 3 or other devices is a supporting-bracket 4, which is provided with a shelf portion 5, to which is rigidly secured the lower end of a headed stud 6.

The numeral 7 indicates the spool or drum supporting yoke, which is formed on the back of its bowed portion with a head 8, which has a vertical perforation 9. This perforation 9 is elongated and is of much larger diameter at its inner than at its outer extremity. The inner extremity of the perforation 9 is of such size that it will pass the head of the stud 6, while the outer extremity of the said perforation is of such size that it snugly fits the body of the said stud. Furthermore, the stud 6 is so located with respect to the back of the bracket 4 and to the thickness of the outer wall of the head 8 that the said outer wall snugly fits between the said stud and the back of the bracket, as best shown in Fig. 3. The drum or spool is shown as made up of a sleeve or hub 10 and thin disk-like metal sides 11, secured to the ends thereof. The sleeve or hub 10 is rigidly secured by a pin 12 or other device to a shaft 13, that is journaled in the prongs of the yoke 7, and is provided at one end with an operating-crank 14 and at its other end with a small ratchet-wheel 15. A gravity-held retaining-pawl 16, pivoted on one prong of the yoke 7, coöperates with the ratchet-wheel 15. The prongs of the yoke 7, it will be noted, embrace the sides 11 of the drum or spool. The letter $z$ indicates a clothes-line, one end of which is shown as secured to the hub 10 of the spool by means of a fastening $z'$ of any suitable construction.

The supporting-bracket 4, as shown, is secured to a pole or post; but it will of course be understood that it may be applied to any suitable support, such as to a portion of a building.

When the reel is applied, as shown in the drawings, and the line is let out, it may be used as a line-tightener, in which case the coöperating ratchet-wheel 15 and pawl 16 serve to hold the winding drum or spool with the line under the desired tension. When it is desired to put the line away, it is wound onto the drum, and the yoke 7 is then detached from the supporting-bracket 4. To detach the said yoke, it must be first turned into the extreme position. (Indicated by dotted lines in Fig. 2.) It is then pushed inward until the head of the stud 6 registers with the larger inner extremity of the perforation 9, whereupon the side walls of the perforation 9 being of less thickness than the distance between the head of the stud 6 and the back of the bracket 4 the said yoke may be lifted from working position.

No amount of jumping or flopping about of the clothes-line under the action of the wind can accidentally uncouple the yoke from the supporting-bracket, for the reason that the thickened outer end wall of the head 8 engages the back of the bracket 4 and prevents the larger inner extremity of the perforation 9 from being alined with the head of the stud 6. At the same time, as already stated, the yoke may be very quickly and easily detached at the will of the operator. By reference to Fig. 2 it will be seen that the post 1 has been cut away at 2 to permit the yoke to be turned into its dotted-line releasing position.

What I claim, and desire to secure by Letters Patent of the United States, is as follows:

The combination with the supporting-bracket 4 having the shelf 5 and headed stud 6, of the detachable clothes-line reel comprising the supporting-yoke 7 with the head 8 having the perforation 9 tapered outward from a larger to a smaller diameter, and the spool or drum mounted in the prongs of said yoke and provided with an operating-crank, the walls of the said perforation 9 of the yoke-head 8 being of such thickness that the yoke may be removed from the stud 6 only when turned to an extreme position, substantially as described.

In testimony whereof I affix my signature in presence of two witnesses.

ANDREW P. JOHNSON.

Witnesses:
VERA O. WHITE,
F. D. MERCHANT.